United States Patent Office 3,311,641
Patented Mar. 28, 1967

3,311,641
HYDROHALIDES OF NOVEL CYCLOHEPTA[b]-
PYRROLE DERIVATIVES AND A PROCESS
FOR PREPARING THE SAME AS WELL AS
INTERMEDIATES AND PROCESS FOR THEIR
PREPARATIONS
Genshun Sunagawa and Yasunobu Sato, Tokyo, Japan,
assignors to Sankyo Company, Limited, Tokyo, Japan
No Drawing. Filed June 16, 1964, Ser. No. 375,652
Claims priority, application Japan, June 22, 1963,
38/32,512
5 Claims. (Cl. 260—326.3)

This invention relates to the hydrohalides of novel cyclohepta[a]-pyrrole derivatives and a process for preparing the same as well as intermediates and process for their preparations. More particularly, it relates to the hydrohalides of novel cyclohepta[b]pyrrole derivatives having the formula

I

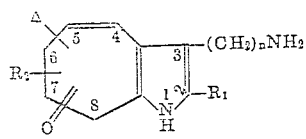

wherein $R_1$ represents hydrogen, alkyl containing 1–5 carbon atoms or carboxyl; $R_2$ represents hydrogen, hydroxyl, alkoxyl containing 1–5 carbon atoms, halogen, straight or branched alkyl containing 1–5 carbon atoms or phenyl; $n$ is integer from 1 to 4; $\Delta$ represents double bond and exists on the cyclohepta[b]pyrrole nucleus at 6- or 7-position: and $O=$ is keto which is attached to the nucleus at 8-position when the double bond exists at 6-position and at 6-position when the double bond exists at 7-position and a process for preparing the same.

It is also concerned with intermediates having the formula

II

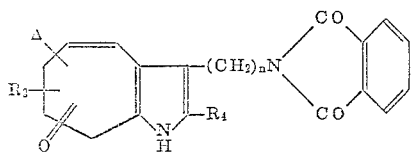

wherein $R_2$ is selected from the group consisting of hydrogen, hydroxyl, alkoxy containing 1–5 carbon atoms, halogen, straight or branched alkyl containing 1–5 carbon atoms and phenyl; $R_4$ is selected from the group consisting of hydrogen, alkyl containing 1–5 carbon atoms, carboxyl, monohydroxyalkoxycarbonyl containing 5–12 carbon atoms on the alkoxy moiety and dihydroxyalkoxycarbonyl containing 5–12 carbon atoms on the alkoxy moiety; $n$ is integer from 1 to 4; and $\Delta$ represents double bond and exists on the cyclohepda[b]pyrrole nucleus at 6- or 7-position; $O=$ represents keto which is attached to the nucleus at 8-position when the double bond exists at 6-position and at 6-position when the double bond exists at 7-position and a process for preparing the same.

The hydrohalides of cyclohepta[b]pyrrole derivatives having the above-mentioned Formula I are novel compounds which are useful in view of their anti-serotonin activities, inhibiting activities, of methylation of physiological amines and the like.

It is an object of this invention to provide the hydrohalides of novel cyclohepta[b]pyrrole derivatives having the above-mentioned Formula I. Another object is to provide a process for preparing the same. Still another object is to provide intermediates having the above-mentioned Formula II and a process for preparing the same.

Other objects will be apparent from the descriptions hereinbelow.

According to the present invention the hydrochlorides of cyclohepta[b]pyrrole derivatives having the above-mentioned Formula I may be prepared by heating a troponylhydrazone derivative having the formula

III

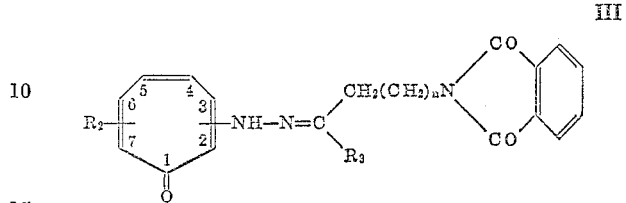

wherein $R_2$ and $n$ have the same meanings as above; $R_3$ represents hydrogen, alkyl containing 1–5 carbon atoms or alkoxycarbonyl containing 1–5 carbon atoms on the alkyl moiety; and the group

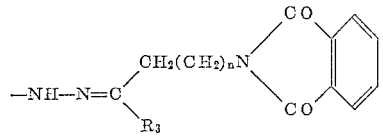

is attached to the tropone ring at 2- or 5-position in the presence of an acid catalyst selected from the group consisting of sulfuric, hydrohalogenic, anhydrous phosphoric and polyphosphoric acids and treating the resulting product with an alkalimetal hydroxide followed by a hydrohalogenic acid.

When polyphosphoric acid is used as the acid catalyst in carrying out the step 1 of this invention the reaction is advantageously effected by heating a troponyl hydrazone derivative having the Formula III in the presence of polyphosphoric acid in an amount, preferably about 5–30 times as much at about 130–300° C.

In case where sulfuric, hydrohalogenic or anhydrous phosphoric acid is used as the acid catalyst in carrying out the step 1 of the present invention the reaction may be advantageously effected by heating a troponyl hydrazone derivative having the Formula III at about 130–300° C. in mono-, di- or trivalent alcohol boiling at 130–300° C., such as amyl, hexyl, heptyl, octyl, nonyl, decyl, or dodecyl alcohol, ethylene glycol or nitrobenzene or one of other suitable solvents in the presence of sulfuric, hydrohalogenic or anhydrous phosphoric acid. In this case there occurs ester-exchange reaction if the troponyl hydrazone derivative of the Formula III in which $R_3$ is an alkoxycarbonyl is used as the starting material and an alcohol as the solvent.

In carrying out the step 2 of this invention the compound obtained in the step 1 is treated with alkali metal hydroxide and then with hydrohalogenic acid. As the alkali metal hydroxide is usually employed sodium hydroxide, potassium hydroxide or the like, which is usually refluxed for about 30 min.—1 hour in about 10–20% aqueous alcohol. As the hydrohalogenic acid is advantageously used hydrochloric acid and the like, and the reactant is refluxed for about 2–3 hours in concentrated or diluted aqueous hydrohalogenic acid.

After completion of the reaction the desired product may be isolated by one of the conventional methods. For example, after carrying out the step 2 as described above the reaction mixture is filtered while hot, the filtrate is concentrated in vacuum and the residue is recrystallized from alcohol such as methanol.

The troponyl hydrazone derivatives having the Formula III used as the starting material in the process of this invention may be easily produced by condensing 2-hydrazino-tropone with corresponding aldehyde or ketone or by reacting diazonium salt obtained from 5-aminotropolone with corresponding α-substituted keto acid ester in the presence of an alkali.

Examples of this invention are given below. It is to be understood that these examples are given for illustration but not for limitation of the scope of the invention in any sense.

EXAMPLE 1

*2-(2-hydroxyethoxy) carbonyl-3-(2-phthalimidoethyl)-5-hydroxycyclohepta (b) pyrrol-6(1H)-one*

A mixture of 500 mg. of ethyl 5-phthalimido-2-oxovalerate, 500 mg. of 5-troponyl hydrazone, 0.6 ml. of concentrated sulfuric acid and 6 ml. of ethylene glycol is heated on an oil bath at 180° C. for 1 hour. After cooling, the reaction mixture is poured into ice water followed by addition of 10% aqueous sodium hydroxide to adjust pH to 4. The mixture is allowed to stand overnight. Crystals precipitated are then recrystallized from ethanol to give 102 mg. of 2-(2-hydroxyethoxy)carbonyl-3-(2-phthalimidoethyl) - 5 - hydroxycyclohepta(b)pyrrol-6(1H)-one as yellowish brown crystals melting at 280° C. (with decomposition).

*2-carboxy-3-(2-aminoethyl)-5-hydroxycyclohepta(b) pyrrol-6(1H)-one hydrochloride*

A mixture of 1.4 g. of 2-(2-hydroxyethoxy)-carbonyl-3-(2-phthalimidoethyl) - 5 - hydroxycyclohepta(b)pyrrol-6(1H)-one thus obtained and 15 ml. of 2 N aqueous ethanol solution of potassium hydroxide is heated under reflux for 1 hour and then the reaction mixture is adjusted to a pH of 6 with 10% hydrochloric acid to precipitate 360 mg. of pale brown crystals. The crystals are refluxed in 20 ml. of 10% hydrochloric acid for 2 hours. The insoluble substance is separated from the reaction mixture by filtration and the filtrate is concentrated under reduced pressure. Crystals precipitated are recrystallized from 2% hydrochloric acid to give yellow crystals decomposing at 290° C., which are 2-carboxy-3-(2-aminoethyl)-5-hydroxycyclohepta(b)pyrrol-6(1H)-one hydrochloride.

*Analysis.*—Found: C, 45.42; H, 5.19; N, 8.48; Cl, 10.89. Calculated for $C_{12}H_{12}O_4N_2 \cdot HCl \cdot 2H_2O$: C, 44.93; H, 5.34; N, 8.75; Cl, 11.06.

EXAMPLE 2

*2-methyl-3-(2-phthalimidoethyl)-7-bromocyclohepta (b)-pyrrol-8(1H)-one*

A mixture of 1.5 g. of 5-phthalimidopentan-2-one 7-bromo-2-troponylhydrazone, obtained by condensation of 2-bromo-7-hydrazinotropone with 5-phthalimidopentan-2-one, and 15 g. of polyphosphoric acid is heated at 150° C. with stirring by a thermometer for 5 min. to effect ring closure. After cooling, 50 ml. of water is added to the reaction mixture to precipitate 500 mg. of a crude product, 2-methyl-3-(2-phthalimidoethyl)-7 - bromocyclohepta(b)pyrrol-8(1H)-one as a reddish orange crystal which is recrystallized from ethanol to give a pure product as a brown crystal melting at above 240° C.

*2-methyl-3-(2-aminoethyl)-7-bromocyclohepta(b)-pyrrol-8(1H)-one hydrochloride.*

A mixture of 600 mg. of 2-methyl-3-(2-phthalimidoethyl)-7-bromocyclohepta(b)pyrrol-8(1H)-one and 10 ml. of 2 N potassium hydroxide in 70% aqueous ethanol is refluxed for 30 min., followed by addition of 10% hydrochloric acid to make pH to about 4, and then crystals thus precipitated are collected. A mixture of the crystals and 10 ml. of concentrated hydrochloric acid is heated under reflux for 3 hours, followed by filtration while hot. The filtrate is concentrated under reduced pressure and the residue is recrystallized from diluted ethanol. There are obtained 100 mg. of 2-methyl-3-(2-aminoethyl)-7-bromocyclohepta(b)pyrrol-8(1H)-one hydrochloride as pale brown crystals melting at above 300° C.

*Analysis.*—Found: C, 45.58; H, 4.51; N, 8.82. Calculated for $C_{12}H_{14}N_2OB_4Cl$: C, 45.37; H, 4.44; N, 8.82.

EXAMPLE 3

*2-methyl-3-(2-phthalimidoethyl)-cyclohepta(b)-pyrrol-8(1H)-one*

A mixture of 3 g. of 5-phthalimidopentan-2-one 2-troponylhydraxon, obtained by condensation of 2-hydrazinotropone with 5-phthalimidopentan-2-one, and 30 g. of polyphosphoric acid is heated at 190° C. with stirring by a thermometer for 5 min. to effect ring closure. After cooling, water is added to the reaction mixture to precipitate a crude product, 2-methyl-3-(2-phthalimidoethyl)-cyclohepta(b)pyrrol-8(1H)-one as a brown crystal which is recrystallized from ethanol to give a pure crystal melting at 180° C. (with decomposition).

*2-methyl-3-(2-aminoethyl)-cyclohepta(b)pyrrol-8(1H)-one dihydrochloride*

A mixture of 1 g. of 2-methyl-3-(2-phthalimidoethyl)-cyclohepta(b)pyrrol-8(1H)-one and 20 ml. of 20% sodium hydroxide solution in 70% ethanol is heated under reflux for 1 hour. After completion of the reaction the reaction mixture is adjusted to a pH of about 4 with 10% hydrochloric acid to precipitate crystals, which are then collected. A mixture of the crystals and 20 ml. of 20% hydrochloric acid is heated under reflux for 3 hours, followed by filtration while hot. The filtrate is concentrated under reduced pressure and the residue is recrystallized from methanol to give pale yellow crystals melting at above 300° C., which are 2-methyl-3-(2-aminoethyl)-cyclohepta(b)pyrrol-8(1H)-one dihydrochloride.

*Analyhis.*—Found: C, 51.93; H, 5.77; N, 10.37; Cl, 26.07. Calculated for $C_{12}H_{16}N_2OCl_2$: C, 52.37; H, 5.86; N, 10.18; Cl, 25.77.

What is claimed:

1. A hydrohalide of a compound having the formula

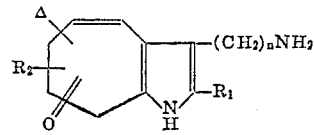

wherein $R_1$ is selected from the group consisting of hydrogen, alkyl of 1–5 carbon atoms and carboxyl; $R_2$ is selected from the group consisting of hydrogen, hydroxyl, alkoxyl of 1–5 carbon atoms, halogen, alkyl of 1–5 carbon atoms and phenyl; $n$ is integer from 1 to 4; Δ represents double bond and exists on the cyclohepta[b]pyrrole nucleus at 6- or 7-position; and O= represents keto which is attached to the nucleus at 8-position when the double bond exists at 6-position and at 6-position when the double bond exists at 7-position.

2. 2 - carboxy - 3 - (2 - aminoethyl) - 5-hydroxycyclohepta[b]pyrrol-6(1H)-one hydrochloride.

3. 2 - methyl - 3 - (2-aminoethyl)-7-bromocyclohepta-[b]pyrrol-8(1H)-one hydrochloride.

4. 2 - methyl - 3 - (2-aminoethyl)-cyclohepta[b]pyrrol-8(1H)-one dihydrochloride.

5. A process for preparing a compound having the formula

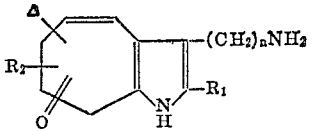

wherein $R_1$ is selected from the group consisting of hydrogen, alkyl of 1–5 carbon atoms and carboxyl; $R_2$ is selected from the group consisting of hydrgen, hydroxyl, alkoxy of 1–5 carbon atoms, halogen, alkyl of 1–5 carbon atoms and phenyl; $n$ is integer from 1 to 4; Δ represents double bond and exists on the cyclohepta[b]pyrrole nucleus at 6- or 7-position; and O= represents keto which is attached to the nucleus at 8-position when the double bond exists at 6-position and at 6-position when the double bond exists at 7-position which comprises heating a compound having the formula

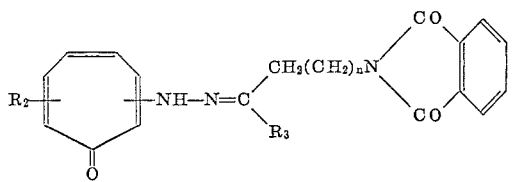

wherein $R_2$ and $n$ have the same meanings as described above; $R_3$ is selected from the group consisting of hydrogen, alkyl of 1–5 carbon atoms and alkoxycarbonyl of 1–5 carbon atoms on the alkyl moiety; and the group

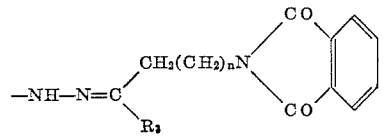

is attached to the tropone ring at 2- or 5-position in the presence of an acid catalyst selected from the group consisting of sulfuric, hydrohalogenic, anhydrous phosphoric and polyphosphoric acids and treating the resulting product with an alkali metal hydroxide.

References Cited by the Examiner

UNITED STATES PATENTS

| | | | |
|---|---|---|---|
| 2,362,614 | 11/1944 | Colva | 167—22 |
| 2,606,155 | 8/1952 | Hill | 252—149 |
| 3,036,088 | 5/1962 | Harris | 260—326 |
| 3,113,950 | 10/1963 | Sunagawa et al. | 260—326.3 |
| 3,122,559 | 2/1964 | Bolton | 260—326 |
| 3,168,532 | 2/1965 | Short | 260—326.3 |

ALEX MAZEL, *Primary Examiner.*

HENRY R. JILES, *Examiner.*

MARY O'BRIEN, JOSE TOVAR, *Assistant Examiners.*